(12) United States Patent
Perenzoni et al.

(10) Patent No.: US 11,079,478 B2
(45) Date of Patent: Aug. 3, 2021

(54) OPTOELECTRONIC SENSOR AND METHOD FOR MEASURING A DISTANCE

(71) Applicant: FONDANZIONE BRUNO KESSLER, Trento (IT)

(72) Inventors: Daniele Perenzoni, Trento (IT); David Stoppa, Trento (IT); Leonardo Gasparini, Trento (IT); Matteo Perenzoni, Trento (IT); Nicola Massari, Trento (IT); Ulrich Zwölfer, Trento (IT); Kai Waslowski, Trento (IT); Alexander Bohli, Trento (IT); Michael Albert, Trento (IT); Friedhelm Wiethege, Trento (IT)

(73) Assignee: FONDAZIONE BRUNO KESSLER, Trento (IT)

( * ) Notice: Subject to any disclaimer, the term of this patent is extended or adjusted under 35 U.S.C. 154(b) by 405 days.

(21) Appl. No.: 16/031,625

(22) Filed: Jul. 10, 2018

(65) Prior Publication Data

US 2019/0018117 A1    Jan. 17, 2019

(30) Foreign Application Priority Data

Jul. 11, 2017  (EP) ................................. 17180828

(51) Int. Cl.
*G01S 7/486* (2020.01)
*G01S 17/10* (2020.01)
(Continued)

(52) U.S. Cl.
CPC .............. *G01S 7/4865* (2013.01); *G01C 3/08* (2013.01); *G01C 15/002* (2013.01);
(Continued)

(58) Field of Classification Search
CPC .... G01S 7/4865; G01S 7/4868; G01S 7/4863; G01S 7/4876; G01S 7/4808;
(Continued)

(56) References Cited

U.S. PATENT DOCUMENTS 4,752,799 A * 6/1988 Stauffer .................. G01S 17/36
356/4.06
4,942,473 A * 7/1990 Zeevi ..................... H04N 5/374
348/281
(Continued)

FOREIGN PATENT DOCUMENTS

JP        2012-18014 A        1/2012

OTHER PUBLICATIONS

Charbon, Edoardo et al., "SPAD-Based Sensors", TOF Range-Imaging Cameras, Springer-Verlag Berlin Heidelberg, 2013, pp. 11-38, ISBN 978-3-642-27523-4.
(Continued)

*Primary Examiner* — Daniel L Murphy
(74) *Attorney, Agent, or Firm* — Nath, Goldberg & Meyer; Jerald L. Meyer

(57) ABSTRACT

An optoelectronic sensor (10) for measuring a distance of an object (18) in accordance with a time of flight principle comprises a light transmitter (12) for transmitting a light signal (14), a light receiver (22) for receiving the light signal (20) after reflection or remission by the object (18), the light receiver (22) having a first plurality of pixel elements (24, 24*a*) each configured as an avalanche photo diode element biased with a bias voltage greater than a breakdown voltage and thus operated in a Geiger mode in order to trigger an avalanche event upon light reception, a distance measuring unit (34) having a second plurality of time of flight measuring units (34*a*) connected to pixel elements (24*a*) for determining a time of flight between transmission and
(Continued)

reception of a light signal, the second plurality being less than the first plurality, switching means (32, 32a) for connecting selected pixel elements (24a) to time of flight measuring units (34a) in a one-to-one fashion, and a pixel selection unit (28, 30) for determining pixel elements (24a) to be connected by the switching means (32, 32a) based on an intensity measurement.

17 Claims, 3 Drawing Sheets

(51) Int. Cl.
G01C 3/08 (2006.01)
G01S 7/48 (2006.01)
G01S 7/4865 (2020.01)
G01S 7/4863 (2020.01)
G01S 7/487 (2006.01)
G01C 15/00 (2006.01)
G01S 7/4861 (2020.01)
G01S 17/04 (2020.01)

(52) U.S. Cl.
CPC .......... *G01S 7/4808* (2013.01); *G01S 7/4861* (2013.01); *G01S 7/4863* (2013.01); *G01S 7/4868* (2013.01); *G01S 7/4876* (2013.01); *G01S 17/10* (2013.01); *G01S 17/04* (2020.01)

(58) Field of Classification Search
CPC ........ G01S 7/4861; G01S 17/10; G01S 17/04; G01C 3/08; G01C 15/002
USPC ...................................................... 356/5.01
See application file for complete search history.

(56) References Cited

U.S. PATENT DOCUMENTS

| 8,773,642 | B2 | 7/2014 | Eisele et al. |
| 9,798,003 | B2* | 10/2017 | Hammes ................. G01S 17/08 |
| 2006/0202129 | A1 | 9/2006 | Niclass et al. |
| 2012/0262696 | A1 | 10/2012 | Eisele et al. |
| 2017/0139041 | A1 | 5/2017 | Drader et al. |

OTHER PUBLICATIONS

Extended European Search Report dated May 24, 2018, for EP application No. 17180828.0.
Partial European Search Report dated Jan. 18, 2018, for EP application No. 17180828.0.

* cited by examiner

OPTOELECTRONIC SENSOR AND METHOD FOR MEASURING A DISTANCE

The invention relates to an optoelectronic sensor and a method for measuring a distance of an object with a time off light principle.

BACKGROUND

The distance of objects can be determined in accordance with the known light time of flight principle using optoelectronic sensors. A short light pulse is transmitted and the time until detection of the remitted or reflected light pulse is measured. Alternatively, in a phase method, the amplitude of transmitted light is modulated and a phase shift between the transmitted light and the received light is determined, with the phase shift being a measure for the time of flight.

The distance measurement can be used, for example, in factory automation, logistics automation or safety engineering. Possible applications include modified light barriers, monitoring the distance between their transmitter and receiver or reflector, respectively, or switching systems with binary object presence detection, the switching state depending on whether there is an object in a specified distance range. Laser scanners are also based on time of flight measurement to determine distances at respective angular positions.

An optoelectronic sensor comprises a light receiver generating an electrical signal from incident reception light. The detection sensitivity of simple photo diodes is not sufficient in many applications. In an avalanche photo diode (APD), the incident light triggers a controlled avalanche breakthrough (avalanche event). This multiplies the charge carriers generated by incident photons, and a photo current is produced which is proportional to the light reception level but significantly larger than in a simple PIN diode. In a so-called Geiger mode, the avalanche photo diode is biased above the breakdown voltage so that even a single charge carrier generated by a single photon can trigger an avalanche, which subsequently recruits all available charge carriers due to the strong field.

Hence, the avalanche diode counts individual events like a Geiger counter from which the name is derived. Geiger mode avalanche photo diodes are also called SPAD (Single Photon Avalanche Diode).

The high radiation sensitivity of SPADs is used in a number of applications. These include medical technology like CT, MRI, or blood tests, optical measuring technology like spectroscopy, distance measurement and three-dimensional imaging, radiation detection in nuclear physics, or uses in telescopes for astrophysics.

Geiger APDs or SPADs thus are very fast, highly sensitive photo diodes on a semiconductor basis. One drawback of the high sensitivity is that not only a measurement photon, but also a weak interference event from ambient light, optical cross talk or dark noise may trigger the avalanche breakdown. The interference event contributes to the measurement signal with the same relatively strong signal as the received measurement light and is indistinguishable within the signal. The avalanche diode subsequently is insensitive for a dead time of about 5 to 100 ns and is unavailable for further measurements during that time.

In many SPAD applications like in medical technology, the sensor operates in a controlled, dark environment with no or little ambient light where interference photons are no serious issue. Industrial sensors, on the other hand, are exposed to high levels of ambient light which in addition varies unpredictably. This is why many SPAD-based distance sensors use a matrix having a plurality of SPADs instead of a single SPAD.

A SPAD matrix in turn poses the problem of combining and processing the SPAD signals. In principle, one could connect each individual SPAD to a distance measurement unit like a TDC (Time-to-Digital Converter). The drawback of this approach is the huge number of TDCs requiring a prohibitive portion of wafer area and thus impairing the fill factor (the ratio of light-sensitive area and total area). Moreover, the TDCs would generate an amount of data which cannot be managed with reasonable bandwidth and processing resources.

Therefore, in conventional distance sensors, several SPADs are combined by OR-gates to form macro pixels, with only the common signal being processed by a TDC. An analog equivalent would be summing up the signals with a resistor network evaluated with a comparator. The combined SPADs usually are operated with a multiplexer in order to connect different macro pixels or SPAD groups with one or only few TDCs in different time windows. One example is disclosed in U.S. Pat. No. 8,773,642 B2, where in addition the size of the macro pixels varies in dependence on the pixel position on the matrix. The multiplexed macro pixel approach is able to deal with ambient light and manageable hardware resources, but at the cost of long measurement periods. It turns out that multiplexing and the statistics generated by macro pixels is far from ideal for fast and robust real-time measurements in industrial sensors.

US 2006/0202129 A1 discloses an integrated circuit comprising an array of SPADs. The SPADs are arranged in columns with one read-out circuit per column. Reading of the pixels is event-based in that a Geiger pulse causes an output line to be pulled down so that the Geiger pulse is evaluated by the column's read-out circuit.

US 2017/0139041 A1 describes a ranging device with imaging capability. An array of SPADs may be divided into zones, and a range estimation circuit is provided for each zone. The zone in turn is divided into macro blocks of several SPADs whose signals are OR-combined. Macroblocks having a low event count or signal-to-noise-ratio may be deselected. The signals of all the remaining macroblocks are OR-combined, and that overall signal is used for a range measurement.

SUMMARY

It is therefore an object of the invention to provide an improved SPAD-based time of flight measurement.

This object is satisfied by an optoelectronic sensor and a method for measuring a distance of an object with a time of flight (ToF) principle in which a light receiver receives a light signal after reflection or remission by the object. The light receiver has a first plurality of pixel elements each configured as an avalanche photo diode element biased with a bias voltage greater than a breakthrough voltage and thus operated in a Geiger mode in order to trigger an avalanche event upon light reception. A distance measuring unit has a smaller plurality of time of flight measuring units connected to pixel elements for determining a time of flight between transmission and reception of a light signal. A switching circuit connects only a selected portion of the pixel elements to time of flight measuring units in a one-to-one fashion, so that only some of the pixel elements are used for time of flight measurement. A pixel selection unit determines pixel elements to be connected by the switching circuit based on an intensity measurement, thus excluding elements actually only contributing ambient light or dark count events from the distance measurement.

As usual in a time of flight measurement, a light transmitter transmits a light signal which is received in a light receiver after diffuse remission or direct reflection at an object whose distance is to be measured. The light receiver comprises a plurality of pixel elements each configured as a SPAD and preferably arranged in a line or matrix. In this context, the term pixel element refers to individual pixels, not macro pixels consisting of a group of individual pixels. A distance measuring comprises a plurality of time of flight measuring units for evaluating the SPAD signals, but the number of time of flight measuring units is less than the number of SPADs.

The invention starts from the basic idea to stick with a one-to-one correspondence of pixel elements and time of flight measuring units. This has proven to generate statistical time of flight data whose evaluation is far superior to macro pixel data. In order to cope with the large number of pixel elements, only a selected portion of the pixel elements is actually connected to a time of flight measuring unit. The connections are established by switching means. The fact that connections can be established should not be mixed up with multiplexing. The latter implies multiple sequential use of the same time of flight measuring unit, contrary to the one-to-one correspondence according to the invention. A multiplexer rather is an element for a 1:n connection. A pixel selection unit determines pixel elements to be connected. The selection is based on an intensity measurement which for example identifies pixel elements actually receiving part of the transmitter's light signal. These pixel elements may form a region of interest (ROI). However, the invention also includes the case that selected pixel elements do not have any specific neighborhood or other spatial properties. The term ROI is to be understood in this broader sense, where the selected pixel elements may be individually distributed over the light receiver in a seemingly random fashion.

The invention has the advantage that due to the superior time of flight data, the measurements are more robust and precise. Distances can be measured very fast and even in adverse conditions with strong and variable ambient or background light. Since only a selected part of the pixel elements are actually evaluated, there is only a need for a moderate number of time of flight measuring units, and consequently only a moderate need for bandwidth and evaluation resources. As the pixel elements are selected based on an intensity measurement, the effects of those pixel elements actually only contributing ambient light or dark count events are eliminated. This significantly increases the signal-to-noise ratio.

The time of flight measuring units preferably each comprise a TDC. This is a very robust component which can easily be integrated on a chip of the light receiver. The TDC for example is started by an electronic signal also triggering the light transmitter, or by an optical reference signal, and is stopped by a signal generated in an avalanche event in the respective pixel element being in one-to-one connection. Another possible TDC mode of operation would be triggering a TDC by the signal from an avalanche event and commonly stopping all active TDCs with a reference signal. This has the advantage that, instead of starting all TDCs upon light transmission, only those TDCs are activated where actually an avalanche event is observed, and thus the required bandwidth for data transfer and power consumption is reduced. The avalanche event is meant to be due to reception of at least one photon of the transmitter's light signal, but may also be caused by ambient light, dark noise or other interference. This is indistinguishable at this stage, but can be dealt with by statistically evaluating larger numbers of avalanche events. The TDC preferably form a TDC array. The number of TDCs is large enough to provide TDCs for the required number of selected pixel elements, but significantly smaller than the total number of pixel elements. For example, the ratio is at most 20%, 10%, 5%, 1% or, in particular in case of a light receiver with several thousands of SPADs, even less.

The switching means preferably comprise a matrix of programmable interconnections. This enables assigning any one of the selected pixel elements with any one of the time of flight measuring units and therefore a flexible establishing of connections without limitations as to which pixel elements can be selected.

The pixel selection unit preferably comprises a plurality of counters, each counter being connected with at least one pixel element for counting avalanche events of the connected pixel elements. Although avalanche events may be caused by interference instead of the useful light of the light transmitter, interference events merely account for a background activity level. Reception of useful light still increases the count beyond the background level and thus is a measure for identifying pixel elements which can actually contribute to a distance measurement.

The switching means preferably connect pixel elements to time of flight measuring units according to the count of avalanche events, in particular those pixel elements having the largest count and/or having a count exceeding a threshold. A threshold criterion may identify more or less pixel elements than available time of flight measuring units. In the former case, the threshold may be increased, or the largest count criterion may additionally be applied. In the latter case, the sensor may simply continue and measure with less pixel elements, with some of the time of flight measuring units not being used. As an alternative, pixel elements with the largest sub-threshold count may be additionally selected.

The counters preferably are column counters or row counters connected to a column or a row of pixel elements. Here and in the following, the roles of row and column are interchangeable in practice. In the description of embodiments below, column counters are described, but row counters could be used in an analogous manner. Column or row counters have an advantage that a considerably smaller total number of counters need to be implemented. This merely determines summarized column or row activity rather than individual pixel element activity. On the other hand, it will suffice in many embodiments to select pixel elements, in particular to exclude pixel elements which do not receive any useful light and only contribute to the noise level.

A column counter only counts events from active rows being a subset of all rows, or a row counter preferably only counts events from active columns being a subset of all columns. These active rows or columns, respectively, are preferably configurable and in particular neighbors. Active rows and columns can be parametrized, for example based on optics simulations of the receptions optics and the light paths in the sensor. Another option is external observation of the reception light spot on the light receiver.

They can also be located in measurements with kind of a moving window of tentative active rows or columns. Then, those columns or rows are activated where the measurement revealed the largest counts, or the counts are evaluated with a median, an average, or the like.

The pixel selection unit is preferably configured to determine pixel elements to be connected by the switching means during manufacturing or teach-in. This pixel element or ROI selection can be done outside operation, where real-time availability of distance values is not required. Then, even time-consuming measurements for selecting pixel elements are possible, for example selecting pixel elements after a statistical evaluation of large numbers of measurement repetitions. However, dynamic pixel selection is not excluded, i.e. changing the pixel selection and thus the connections between pixel elements and time of flight measuring units during operation between distance measurements.

The pixel elements preferably each comprise a time of flight measurement output and a counter output. The time of flight measurement output is used to determine the reception point in time, for example a signal stopping a TDC. Consequently, it has to define a very precise point in time for example with a rising or falling edge of a pulse. On the other hand, the counter output merely is binary information that an avalanche event occurred. Both outputs can be generated in parallel, so that pixel selection and distance measurement can take place simultaneously within all practical limits. This enables very fast dynamic pixel element selection, up to where during a distance measurement the pixel elements to be selected in the subsequent measurement are determined.

The pixel elements preferably each comprise deactivation means. Pixel elements which are not selected and thus not connected to a time of flight measurement cannot impair the distance measurement. However, there are still avalanche events in these unused pixel elements, consuming power and increasing heat generation. Moreover, some pixels have a high dark count rate or other defect so that they should be excluded from the selection process in the first place, irrespective of what the pixel selection unit would decide. Deactivation of pixel elements is possible for example in that their bias voltage is switched off or at least decreased below the breakthrough voltage.

The pixel elements each preferably comprise at least one small light-sensitive area and at least one large light-sensitive area, the output signal of the pixel elements being configurable as a weak signal of the small light-sensitive area, a stronger signal of the large light-sensitive area, or a strong signal as the sum of both the small and the large light-sensitive area. Pixel elements thus are adaptable to a larger dynamic range. In case of a weak received light signal, the large light-sensitive area or even both light-sensitive areas are used, and vice versa in case of a strong received light signal, the small light-sensitive area is used. The pixel element thus has a configurable sensitivity and fill factor. In spite of having the small and large light-sensitive area, pixel elements are still individual pixels and not macro pixels. In any configuration, the light-sensitive areas generate only one signal, and it is impossible to independently access a signal of only the small light-sensitive area or only the large light-sensitive area.

The sensor preferably further comprises histogram evaluation means for statistically evaluating a plurality of times of flight generated by the time of flight measuring units of the distance measuring unit. As mentioned on various occasions, the signal of an individual pixel element is unreliable, because it is undistinguishable whether it originates from photons of the transmitted and remitted light signal or is just an interference event. Conventional macro pixels make use of an averaging effect right at the front of the evaluation chain, with the adverse effect that information is lost for more sophisticated downstream statistical methods. The approach of the invention is to preserve the relevant original time information, and to postpone statistical evaluation until enough avalanche events are available after spatial accumulation over the plurality of time of flight measuring units, and possible additional temporal accumulation over measurement repetitions. This statistical accumulation and evaluation is the task of the histogram evaluation means, which are connected to the time of flight measuring units and may or may not be integrated on the same chip.

The sensor preferably is a switching sensor, switching its output state in dependence on whether an object has been detected within a specified distance range. This kind of sensor is widely used in industrial applications for tasks like sorting, often with the sensor mounted at a conveyor where the objects to be detected are conveyed. Obviously, the sensor may also output or display a distance value.

The inventive method can be modified in a similar manner and shows similar advantages. Further advantageous features are described in the sub claims following the independent claims in an exemplary, but non-limiting manner.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
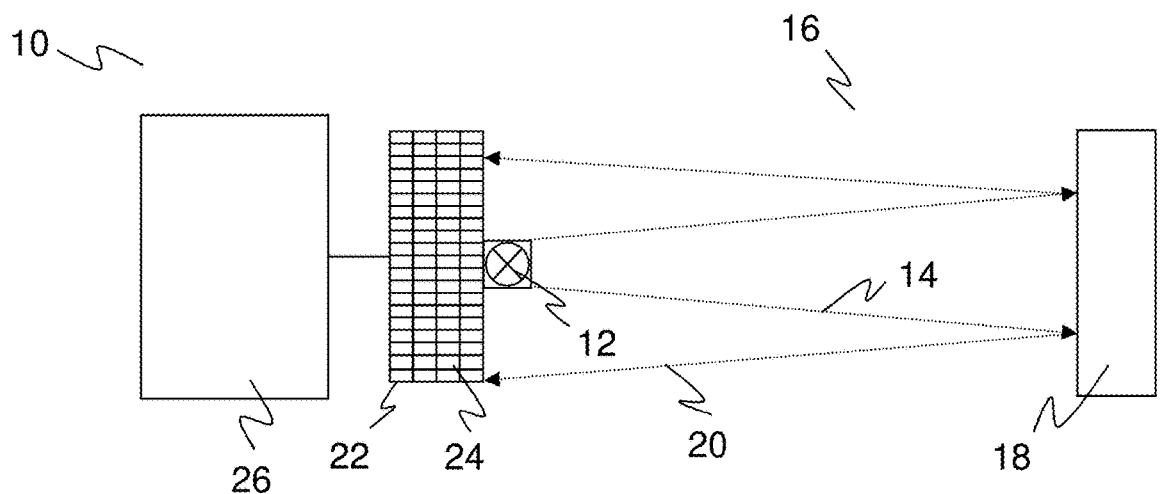
FIG. 1 a schematic view of an optoelectronic sensor for distance measurements.

FIG. 1 shows a simplified schematic view of an optoelectronic sensor 10 for measuring distances according to a time of flight principle in a one-dimensional embodiment. A light transmitter 12, for example an LED or a laser light source, transmits a light signal 14 into a monitoring area 16. In case that there is an object 18, a part of the light is diffusely remitted or reflected and returns to the sensor 10 as a remitted light signal 20, where it is registered in a light receiver 22.

Light receiver 22 comprises a plurality of pixel elements 24, also referred to as SPADs because they are configured as an avalanche photo diode element biased with a bias voltage greater than a breakthrough voltage and thus operated in a Geiger mode in order to trigger an avalanche event upon light reception. Some basic SPAD properties have been described in the introduction. The pixel elements 24 are preferably arranged in a matrix.

The light receiver 22 is connected to a control and evaluation unit 26, where signals of the pixel elements 24 are evaluated in order to determine the time of flight from a transmission point in time of the transmitted light signal 14 until a reception point in time of the remitted light signal 20, respectively. The time of flight can be converted into a distance by means of the speed of light. Control and evaluation unit 26 is shown as a simple block element only in FIG. 1 and will be explained in detail below. Control and evaluation unit 26 may also control light transmitter 12 and cause it to transmit the light signal, in particular a light pulse or pulse train. The point in time when a light signal is triggered may be used as a reference for time of flight measurement. In other embodiments, the transmitted light signal 14 may be used as an optical reference by means of an optical short-cut for part of the transmitted light.

In practice, sensor 10 comprises additional elements, in particular transmission and reception optics as well as interfaces, which are omitted for simplicity. Dividing light receiver 22 and control and evaluation unit 26 as in FIG. 1 is possible in a practical embodiment, but this is mainly for the sake of the explanation. Preferably, these components are at least partially integrated on a same chip whose surface is shared by the pixel elements 24 and circuitry assigned or assignable to pixel elements 24 or groups of pixel elements 24 for their control and evaluation.

In FIG. 1, there is a coaxial arrangement in that the light transmitter 12 is arranged in front of light receiver 22. Other coaxial arrangements are possible, for example using a beam splitter. A biaxial or triangulation arrangement is also conceivable, with light transmitter 12 and light receiver 22 arranged next to one another with a mutual displacement.

Sensor 10 may be a one-dimensional sensor of the scanning type as illustrated in FIG. 1. Other embodiments include light barriers, in particular a light barrier monitoring the distance of a corresponding reflector at the opposite end of the monitoring beam, light grids and scanners. Sensor 10 can output or display a distance value or can also operate as a switch in that a switch event is triggered on detection of an object in a specific distance range including a deviation from an expected distance range. A plurality of sensors 10 can be combined, for instance to form a distance-measuring or distance-monitoring light grid. Mobile systems are also conceivable in which the sensor 10 is mounted movably, or scanning systems in which the transmitted light signal 14 sweeps over monitored area 16 by means of a movable mirror, or by moving the measuring system, in particular with a rotary movement.

Figure 2:
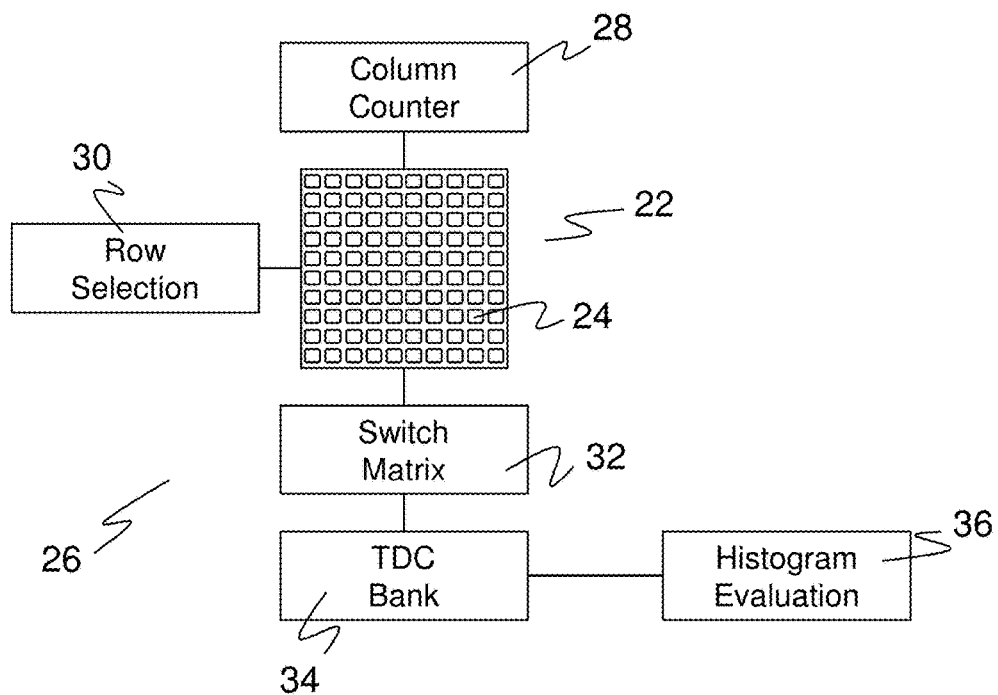
FIG. 2 a schematic view of a pixel matrix and a control and evaluation unit for measuring distances based on the SPAD output.

FIG. 2 shows light receiver 22 and components of control and evaluation unit 26 in a schematic view. In this embodiment, light receiver 22 comprises a regular two-dimensional matrix of pixel elements 24. The number of pixel elements 24 may vary, the matrix for example may be a quadratic or rectangular arrangement with some tens, hundreds or even thousands of pixel elements 24 and more.

Avalanche events are triggered in the pixel elements 24 either upon reception of remitted light signal 20, which is a desired measurement event, or by ambient light photons or other interference light dark noise. Light receiver 22 and control and evaluation unit 26 are designed with the goal of being able to cope even with high and varying levels of ambient light. This is achieved in that only some of the pixel elements 24 are selected and used for time of flight measurement. However, in contrast to the prior art, selected pixel elements 24 are evaluated individually rather than as macro pixels, thus providing original measurement information at the smallest possible detail level, unaltered by averaging or similar summarizing processes with inevitable information loss. As a prerequisite, the most promising pixel elements 24 need to be selected.

Figure 3:
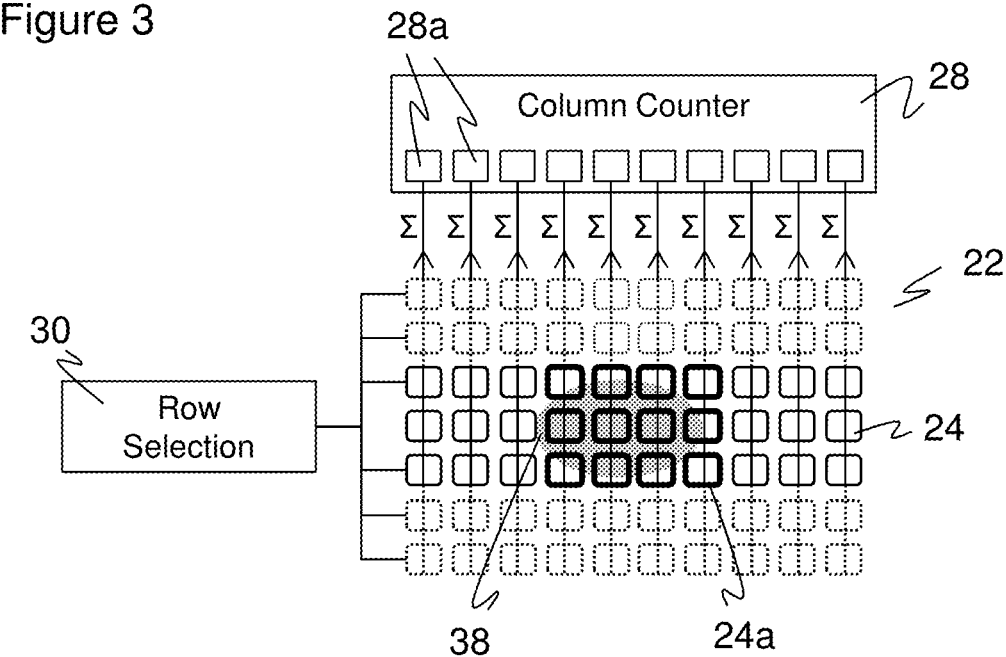
FIG. 3 a detailed partial view of a column counter for selecting pixels to be used for time of flight measurements.

For the selection process, control and evaluation unit 26 comprises column counter unit 28. The task of column counter unit 28, which will be described in more detail with reference to FIG. 3, is to locate active columns of pixel elements 24 which actually register photons of the remitted light signal 20. As implied by its name, column counter unit 28 merely provides a summary count of all pixel elements 24 in a column. In principle, there could be individual counters for each pixel element, but the costs and area consumption would counter large parts of the advantages of pixel selection. In order to limit the pixel elements 24 in a column, there is an optional row selection unit 30, which activates only some of the rows, so that pixel elements 24 in inactive rows do not contribute to the column count. In this context, column and row are but terms, their roles could be exchanged in other embodiments.

With the information from the selection process, a switch matrix 32 is configured so that each selected pixel element 24 is connected to a time of flight measuring unit of a distance measuring unit 34 in a one-to-one fashion. This will be explained in more detail with reference to FIG. 4. In a preferred embodiment, the time of flight measuring units are TDCs, with the distance measuring unit 34 also referred to as TDC array or TDC bank.

During operation, the time of flight measuring units will generate individual time of flight measurements or time stamps, each being one individual distance measurement, which is a raw measurement because it still needs correction with calibration information for internal delays and the like, and unit conversion by means of the speed of light. Due to the nature of SPADs, these individual distance measurements are very unreliable, because the avalanche effect might be caused by ambient light or dark noise, with the corresponding individual time of flight completely uncorrelated to the actual distance.

Therefore, the individual times of flight are accumulated and evaluated in a histogram evaluation unit 36. The histogram is an approximation of the time of flight distribution, with time bins on the X-axis and the number of avalanche events measuring the time of flight within one of these bins on the Y-axis. With a sufficient number of avalanche effects, the histogram will show a distinct peak whose position can be used to determine an overall time of flight, and thus distance. Avalanche events can be accumulated over space, namely, from different time of flight measuring units, and/or time, namely, measurement repetitions. It is also possible to not form the entire histogram, but to partially evaluate avalanche events prior to accumulation and to thus exclude stray events at an early stage. There may be more than one peak, for example in case of half-transparent objects, glass, or fog. Such multiple targets can also be identified from the histogram. Since the invention is not about histogram evaluation, the various possibilities are merely mentioned and will not be described in any detail.

As already mentioned, light receiver 22 and components of the control and evaluation unit 26 may be integrated on a same chip. In a preferred embodiment, light receiver 22 and components 28, 30, 32, 34 for pixel element 24 selection, connection, and evaluation are part of an ASIC (Application-Specific Integrated Circuit), while histogram evaluation unit 36 is implemented on a microprocessor. In yet another embodiment, histogram evaluation unit 36 at least partially is also integrated on the ASIC.

FIG. 3 shows details for column counter unit 28 and row selection unit 30. The goal is to identify pixel elements 24a, shown in bold, which register useful light of reception light spot 38 originating from remitted light signal 20 on light receiver 22. Column counter unit 28 comprises a plurality of column counters 28a each connected to the pixel elements 24 of one column of the matrix arrangement of pixel elements 24.

Whenever there is an avalanche event in a pixel element 24, the corresponding column counter 28a is increased. The count of a column counter 28a therefore is a measurement value for activity in the associated column. All pixel elements 24 are prone to avalanche events caused by ambient light and dark noise. Only in some pixel elements 24a, avalanche events are in addition triggered by reception light spot 38. Therefore, the count of column counters 28a will be larger in column counters corresponding to columns including pixel elements 24a where the reception light spot 38 impinges than for other columns. This is used to distinguish the columns and to select pixel elements 24a, for example those with the largest column count, or those with the column count exceeding a threshold.

The column counter unit 28 does not have a resolution in column direction, i.e. its information cannot be used to identify relevant rows for selecting pixel elements 24a. Therefore, optional row selection unit 30 is connected to the pixel elements 24a and capable of activating only some of the rows, in this example three rows. The inactive rows of pixel elements 24, shown in dashed line, do not contribute to the column count.

The active rows can be parametrized. For example, optics simulation of the sensor 10 will reveal the rows where the reception light spot 38 is to be expected. Another option is to observe reception light spot 38 by external means during manufacturing or setup. It is also possible to use column counter unit 28 to identify active rows. To that end, different groups of rows are systematically activated, and after at least one measurement for each group, the group with the largest summarized column count or meeting a similar criterion will be used for the active rows. The identification of active rows need not be exact, the relative position of reception light spot 38 and the selected pixel elements 24a of FIG. 3 are kind of an ideal case. Any mismatch will not render the sensor 10 dysfunctional, but merely have an impact on the overall signal-to-noise ratio since some pixel elements 24 will be selected which only register background.

In the embodiment of FIG. 3, columns and rows are not treated equally. Firstly, the roles of course may be reversed in other embodiments. Secondly, there is a reason for the column count. In a biaxial arrangement of the sensor 10, i.e. when in contrast to FIG. 1 light transmitter 12 and light receiver 22 are arranged next to one another with a mutual displacement, there will be a triangulation effect: The reception light spot 38 moves over light receiver 22 depending on the distance of object 18. This movement should advantageously be aligned with the rows of pixel elements 24, i.e. the reception light spot 38 moves within a row. Then, the active rows are static, because reception light spot 38 will be registered by the same rows for any distance of object 18. The column, however, varies with object distance. Hence the column count unit 28, which is capable of tracking reception light spot 38 as it moves along the rows.

In the coaxial arrangement of FIG. 1, static selection of pixel elements 24a during manufacturing, setup or re-calibration is sufficient. In a biaxial arrangement, dynamic selection of pixel elements 24a to track the reception light spot 38 may be useful. In both the coaxial and biaxial case, the reception light spot 38 increases in size for near distances. However, in a preferred embodiment, selection of pixel elements 24a does not even try to match the varying size. Near objects 18 anyway will remit a lot of energy, so that the dynamical range will only improve if not all this energy is registered.

Figure 4:
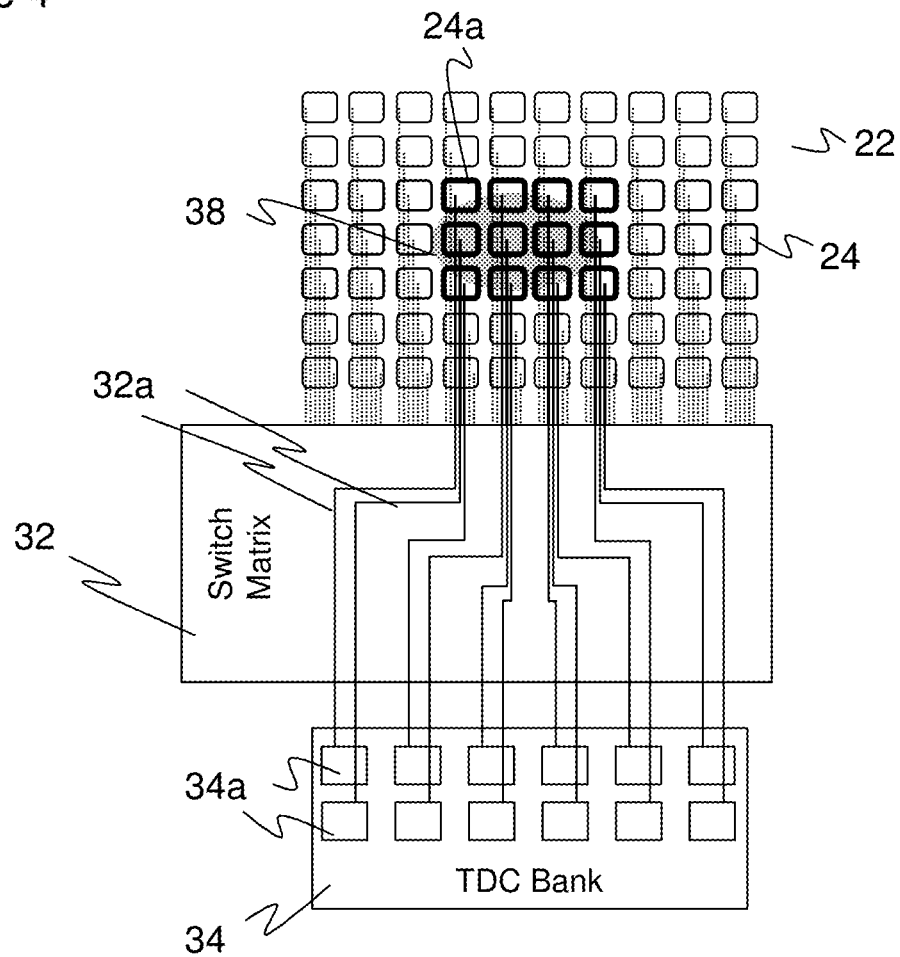
FIG. 4 a detailed partial view of a switch matrix for establishing one-to-one connections between selected pixels and time of flight measuring units.

FIG. 4 shows details for establishing one-to-one connections between the selected pixel elements 24a and time of flight measuring units 34a of the distance measuring unit 34. To this end, switch matrix 32 is connected to all pixel elements 24 on the one hand and to all time of flight measuring units 34a on the other. Switch matrix 32 comprises a set of programmable interconnections 32a so that desired one-to-one connections between a pixel element 24 and a time of flight measuring unit 34a can be established.

Since there are considerably fewer time of flight measuring units 34a than pixel elements 24, only a small part of this connections 32a, shown in solid line, actually are completely established, while the other connections, shown in dashed line, are interrupted by switch matrix 32. The selected pixel elements 24a with established connections to time of flight measuring units 34a have previously been determined for example as explained with reference to FIG. 3, and switch matrix 32 is programmed accordingly.

Therefore, only the selected pixel elements 24a actually contribute to the distance measurement. These selected pixel elements 24a generate the relevant measurement information with a high signal-to-noise-ratio, since the probability that avalanche events registered by the selected pixel elements 24a are due to useful light is significantly increased, while pixel elements 24 anyway only monitoring background are excluded from the distance measurement. At the same time, a comparably small number of time of flight measurement units 34a for their evaluation is sufficient.

The switch matrix 32 may be flexible so that any arbitrary pixel element 24 can be connected to any time of flight measuring unit. In other embodiments, restrictions are possible, for example that only continuous regions of pixel elements 24a can be connected to time of flight units 34a. In practice, a continuous reception light spot 38 can be expected, and the limitation of possible connectivity may simplify the structure of switch matrix 32.

Figure 5:
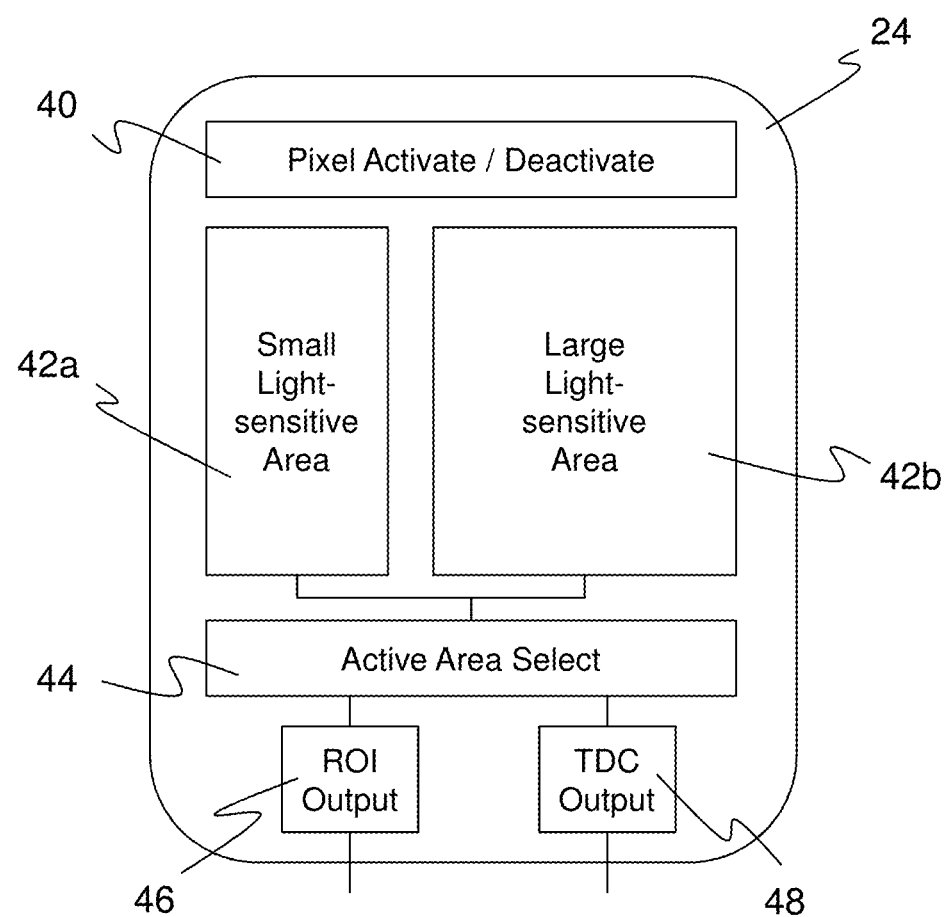
FIG. 5 a schematic view of an individual pixel element having two light sensitive areas of different size and two outputs.

FIG. 5 shows a schematic view of an embodiment of an individual pixel element 24. In general, pixel elements 24 are SPADs. The additional structure of FIG. 5 is an advantageous example not limiting the scope of the invention, and in particular pixel elements 24 may comprise only part of the structure shown in FIG. 5.

Pixel element 24 comprises activation/deactivation means 40 so that pixel elements 24 can be individually enabled or disabled. This may be achieved by the activation/deactivation means 40 having a memory or flag which can be set according to the desired state. A pixel element 24 may effectively be disabled by decreasing the bias voltage below the breakthrough voltage, so that the SPAD properties including the exceptional sensitivity are lost.

Pixel element 24 also comprises not only one, but two light-sensitive areas 42a-b of different size. They are connected to active area selection means 44 by means of which the pixel element 24 can be configured to operate in one of three states: use of exclusively the small light sensitive area 42a in case of strong remitted light signals 20, use of exclusively the large light sensitive area 42b in case of moderate to weak remitted light signals 20, and use of both light sensitive areas 42a-b in case of weak remitted light signals 20. Pixel element 24 still operates as a single pixel element, the signals of light sensitive areas 42a cannot be individually accessed. However, it has configurable sensitivity or fill factor, and this adaption can be used to increase the dynamic range of sensor 10. The sensitivity or fill factor setting is preferably global for all pixel elements, but could also be individual on a per-pixel basis.

Finally, pixel element 24 has two outputs 46, 48. ROI or counter output 46 provides binary information that an avalanche event occurred in pixel element 24, this information for example being reset after some time interval or between measurement repetitions. This information is used in column counter unit 28 for selecting pixel elements 24*a*. TDC or time of flight measurement output 48, on the other hand, provides a signal with very precise time information of an avalanche event, for example a pulse or a step. The pulse does not need to be short in itself on a distance resolution scale, for example in the picosecond range, because a rising or falling edge can also bear the information. The two outputs could also be implemented with a same physical output, but different types of signals, for example a very short pulse or other code as a time signal for the time of flight measuring units 34*a* and some code or a simple low or high signal to merely indicate an avalanche event for the column counter unit 28.

Due to the two outputs 46, 48, pixel element 24*a* selection in column counter unit 28 and distance measurement by the time of flight measuring units 34*a* can take place simultaneously. This allows, while measuring a distance, to dynamically select pixel elements 24*a* in real-time for a subsequent measurement.

The invention claimed is:

1. An optoelectronic sensor (10) for measuring a distance of an object (18) in accordance with a time of flight principle, the sensor (10) comprising
a light transmitter (12) for transmitting a light signal (14),
a light receiver (22) for receiving the light signal (20) after reflection or remission by the object (18), the light receiver (22) having a first plurality of pixel elements (24, 24*a*) each configured as an avalanche photo diode element biased with a bias voltage greater than a breakthrough voltage and thus operated in a Geiger mode in order to trigger an avalanche event upon light reception
and a distance measuring unit (34) having a second plurality of time of flight measuring units (34*a*) connected to pixel elements (24*a*) for determining a time of flight between transmission and reception of a light signal, the second plurality being less than the first plurality,
switching means (32, 32*a*) for connecting only a selected portion of the pixel elements (24*a*) to time of flight measuring units (34*a*) in a one-to-one fashion, so that only some of the pixel elements (24*a*) are used for time of flight measurement,
and a pixel selection unit (28, 30) for determining pixel elements (24*a*) to be connected by the switching means (32, 32*a*) based on an intensity measurement, thus excluding pixel elements actually only contributing ambient light or dark count events from the distance measurement.

2. The sensor (10) according to claim 1, wherein the time of flight measuring units (34*a*) each comprise a Time-to-Digital Converter (TDC).

3. The sensor (10) according to claim 1, wherein the switching means (32) comprise a matrix of programmable interconnections (32*a*).

4. The sensor (10) according to claim 1, wherein the pixel selection unit (28) comprises a plurality of counters (28*a*), each counter (28*a*) being connected with at least one pixel element (24) for counting avalanche events of the connected pixel elements (24).

5. The sensor (10) according to claim 4, wherein the switching means (32, 32*a*) connect pixel elements (24*a*) to time of flight measuring units (34*a*) according to the count of avalanche events, in particular those pixel elements (24*a*) having the largest count and/or having a count exceeding a threshold.

6. The sensor (10) according to claim 4, wherein the counters (28) are column counters or row counters connected to a column or a row of pixel elements (24).

7. The sensor (10) according to claim 6, wherein a column counter (28*a*) only counts events from active rows being a subset of all rows, or wherein a row counter only counts events from active columns being a subset of all columns.

8. The sensor (10) according to claim 4, wherein the pixel elements (24) each comprise a time of flight measurement output (48) and a counter output (46).

9. The sensor (10) according claim 1, wherein the pixel selection unit (28, 30) is configured to determine pixel elements (24*a*) to be connected by the switching means (32, 32*a*) during manufacturing or teach-in.

10. The sensor (10) according to claim 1, wherein the pixel elements (24) each comprise deactivation means (40).

11. The sensor (10) according to claim 1, further comprising histogram evaluation means (36) for statistically evaluating a plurality of times of flight generated by the time of flight measuring units (34*a*) of the distance measuring unit (34).

12. The sensor (10) according to claim 1, wherein the sensor (10) is a switching sensor switching its output state in dependence on whether an object (18) has been detected within a specified distance range.

13. A method for measuring a distance of an object (18) in accordance with a time of flight principle, the method comprising the steps of
transmitting a light signal (14);
receiving the light signal (22) after reflection or remission by the object (18) in a light receiver (22) having a first plurality of pixel elements (24, 24*a*) each configured as an avalanche photo diode element biased with a bias voltage greater than a breakthrough voltage and thus operated in a Geiger mode in order to trigger an avalanche event upon light reception, and
determining a time of flight between transmission and reception of a light signal (14, 22) by means of a second plurality of time of flight measuring units (34*a*) connected to pixel elements (24*a*), the second plurality being less than the first plurality,
connecting only a selected portion of the pixel elements (24*a*) to time of flight measuring units (34*a*) in a one-to-one fashion, so that only some of the pixel elements (24*a*) are used for time of flight measurement,
and selecting pixel elements (24*a*) to be connected based on an intensity measurement, thus excluding pixel elements actually only contributing ambient light or dark count events from the distance measurement.

14. An optoelectronic sensor (10) for measuring a distance of an object (18) in accordance with a time of flight principle, the sensor (10) comprising
a light transmitter (12) for transmitting a light signal (14),
a light receiver (22) for receiving the light signal (20) after reflection or remission by the object (18), the light receiver (22) having a first plurality of pixel elements (24, 24*a*) each configured as an avalanche photo diode element biased with a bias voltage greater than a breakthrough voltage and thus operated in a Geiger mode in order to trigger an avalanche event upon light reception
and a distance measuring unit (34) having a second plurality of time of flight measuring units (34*a*) connected to pixel elements (24*a*) for determining a time of flight between transmission and reception of a light signal, the second plurality being less than the first plurality, switching means (32, 32*a*) for connecting only a selected portion of the pixel elements (24*a*) to time of flight measuring units (34*a*) in a one-to-one fashion, so that only some of the pixel elements (24*a*) are used for time of flight measurement, and a pixel selection unit (28, 30) for determining pixel elements (24*a*) to be connected by the switching means (32, 32*a*) based on an intensity measurement, thus excluding pixel elements actually only contributing ambient light or dark count events from the distance measurement, wherein the switching means (32) comprise a matrix of programmable interconnections (32*a*), and wherein the pixel selection unit (28) comprises a plurality of counters (28*a*), each counter (28*a*) being connected with at least one pixel element (24) for counting avalanche events of the connected pixel elements (24).

15. The sensor (10) according to claim 14, wherein the switching means (32, 32*a*) connect pixel elements (24*a*) to time of flight measuring units (34*a*) according to the count of avalanche events, in particular those pixel elements (24*a*) having the largest count and/or having a count exceeding a threshold.

16. The sensor (10) according to claim 14, wherein the counters (28) are column counters or row counters connected to a column or a row of pixel elements (24).

17. The sensor (10) according to claim 16, wherein a column counter (28*a*) only counts events from active rows being a subset of all rows, or wherein a row counter only counts events from active columns being a subset of all columns.

\* \* \* \* \*